United States Patent
Rodriguez Bravo et al.

(10) Patent No.: US 12,457,154 B2
(45) Date of Patent: Oct. 28, 2025

(54) AUTOMATIC IDENTIFICATION OF CHANGES ON SERVERS WITH SCHEDULED MAINTENANCE

(71) Applicant: Kyndryl, Inc., New York, NY (US)

(72) Inventors: Cesar Augusto Rodriguez Bravo, Alajuela (CR); Kim A. Eckert, Austin, TX (US); David Alonso Campos Batista, Aurora (CR)

(73) Assignee: Kyndryl, Inc., New York, NY (US)

( * ) Notice: Subject to any disclaimer, the term of this patent is extended or adjusted under 35 U.S.C. 154(b) by 210 days.

(21) Appl. No.: 18/465,410

(22) Filed: Sep. 12, 2023

(65) Prior Publication Data
US 2025/0085979 A1    Mar. 13, 2025

(51) Int. Cl.
*H04L 41/082* (2022.01)
*H04L 41/0869* (2022.01)

(52) U.S. Cl.
CPC ........ *H04L 41/082* (2013.01); *H04L 41/0869* (2013.01)

(58) Field of Classification Search
None
See application file for complete search history.

(56) References Cited

U.S. PATENT DOCUMENTS

| | | | |
|---|---|---|---|
| 7,203,868 B1 * | 4/2007 | Evoy | G06F 11/3055 714/39 |
| 7,469,287 B1 | 12/2008 | Castillo | |
| 8,448,015 B2 | 5/2013 | Gerhart | |
| 8,462,961 B1 * | 6/2013 | Bywaters | H04R 27/00 709/227 |
| 8,560,889 B2 | 10/2013 | Behrendt | |
| 10,958,517 B2 * | 3/2021 | Mahimkar | H04N 21/26291 |
| 11,334,338 B2 | 5/2022 | Murthy | |
| 2003/0226059 A1 * | 12/2003 | Braun | G06F 11/0775 714/E11.179 |
| 2004/0141508 A1 | 7/2004 | Schoeneberger | |
| 2004/0143811 A1 * | 7/2004 | Kaelicke | G06Q 10/10 717/104 |
| 2004/0179668 A1 * | 9/2004 | Gilbert | H04M 7/009 379/210.01 |

(Continued)

FOREIGN PATENT DOCUMENTS

| | | | | |
|---|---|---|---|---|
| EP | 1686465 A2 * | 8/2006 | | G06F 9/4451 |
| EP | 2005712 B1 | 3/2019 | | |

(Continued)

*Primary Examiner* — Sandarva Khanal
(74) *Attorney, Agent, or Firm* — CANTOR COLBURN LLP; Erik Swanson

(57) ABSTRACT

An approach is disclosed that determines that a change is needed to a remote system that is managed by a change management system that manages changes to many remote systems. A change management time window when the change is scheduled to be performed at the selected remote system is identified and a monitoring request is sent to the remote system. The monitoring request causes the remote system to run a monitoring process. The change management system receives an activity notification that was identified by the monitoring process. In response to the activity notification matching the change needed, the change scheduled at the selected remote system is canceled by the change management system.

18 Claims, 6 Drawing Sheets

(56) References Cited

U.S. PATENT DOCUMENTS

| | | | |
|---|---|---|---|
| 2014/0108775 A1* | 4/2014 | Kludy | G06F 11/0793 |
| | | | 713/2 |
| 2016/0065736 A1 | 3/2016 | Pedersen | |
| 2016/0191780 A1* | 6/2016 | Li | H04L 61/2585 |
| | | | 348/211.3 |
| 2017/0068963 A1 | 3/2017 | Saxena | |
| 2017/0093629 A1* | 3/2017 | Cong | H04L 41/0866 |
| 2020/0226025 A1 | 7/2020 | Rodriguez Bravo | |
| 2020/0412625 A1* | 12/2020 | Bagarolo | H04L 43/0805 |
| 2021/0157666 A1 | 5/2021 | Spencer | |
| 2022/0147367 A1 | 5/2022 | Ali | |
| 2022/0215325 A1 | 7/2022 | Odibat | |
| 2024/0202006 A1* | 6/2024 | Krijger | G06F 9/4403 |
| 2024/0411462 A1* | 12/2024 | Ibrahim | G06F 15/7821 |

FOREIGN PATENT DOCUMENTS

| | | | | |
|---|---|---|---|---|
| EP | 3598355 | A1 | 1/2020 | |
| WO | 1999015979 | A1 | 4/1999 | |
| WO | 2004086168 | A2 | 10/2004 | |
| WO | 2010141034 | A1 | 12/2010 | |
| WO | 2016061520 | A1 | 4/2016 | |
| WO | WO-2020153884 | A1 * | 7/2020 | ...... H04W 36/00837 |

* cited by examiner

AUTOMATIC IDENTIFICATION OF CHANGES ON SERVERS WITH SCHEDULED MAINTENANCE

BACKGROUND

Scheduled maintenance tasks can include software security updates, hardware upgrades, and other activities that require downtime. The customer, or system user, is typically notified of the upcoming maintenance windows. When maintenance is complete, the system user is typically notified with a confirmation message. Occasionally, maintenance might need to be performed outside the monthly maintenance window. A maintenance task might be to reboot the system in order for software, such as installed patches, to be applied to the system. Prior to the scheduled maintenance window, a scheduled maintenance task, such as a reboot, might be performed for other reasons, such as after a power outage, etc. During the scheduled maintenance window, traditional approaches run the scheduled maintenance tasks, such as the reboot, even though the task has already been performed.

SUMMARY

An approach is disclosed that determines that a change is needed to a remote system that is managed by a change management system that manages changes to many remote systems. A change management time window when the change is scheduled to be performed at the selected remote system is identified and a monitoring request is sent to the remote system. The monitoring request causes the remote system to run a monitoring process. The change management system receives an activity notification that was identified by the monitoring process. In response to the activity notification matching the change needed, the change scheduled at the selected remote system is canceled by the change management system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
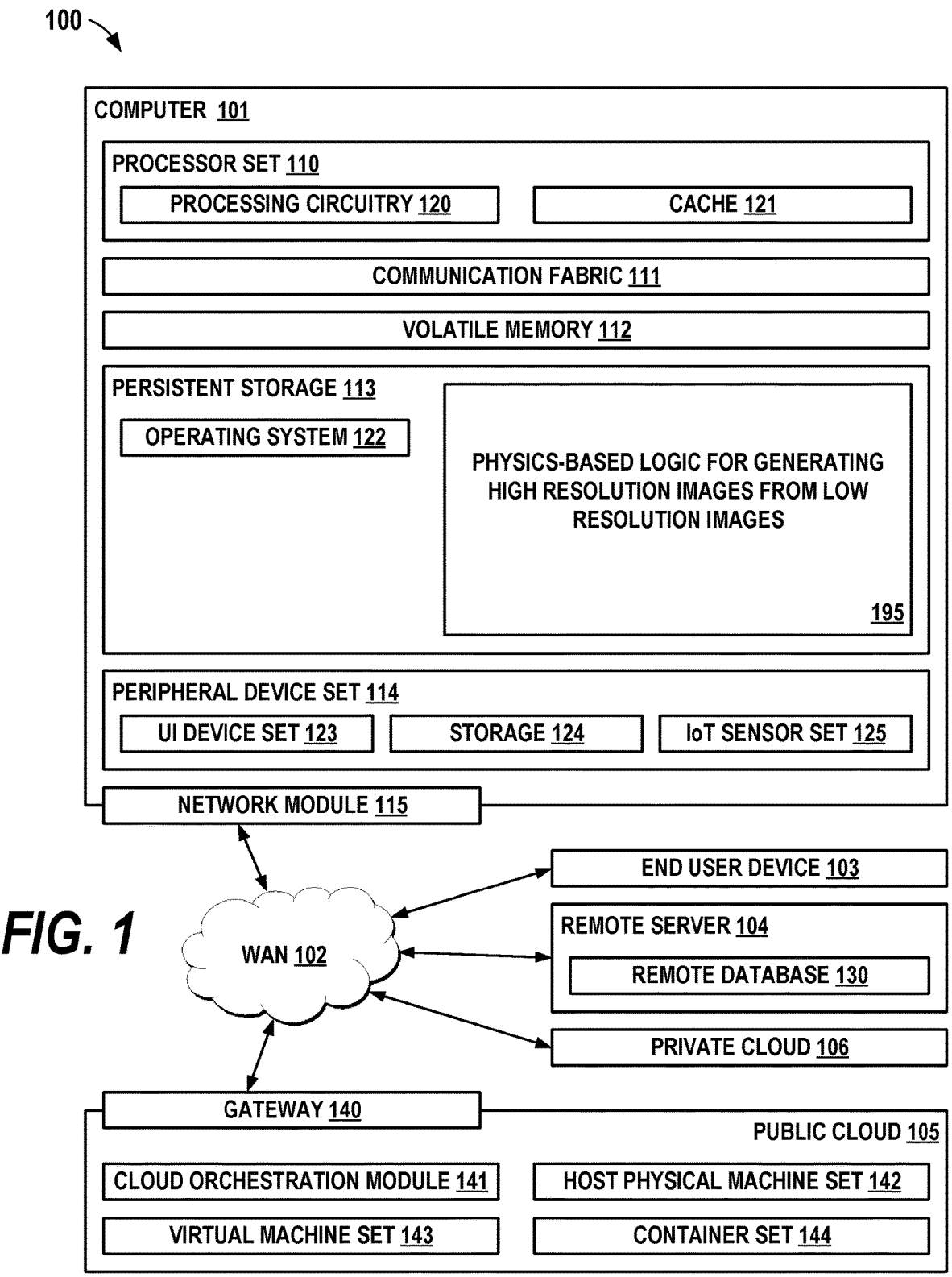
FIG. 1 is a block diagram of a data processing system in which the methods described herein can be implemented.

FIGS. 1-6 describe an approach that executes a monitoring rule on a server every time that a change record is created. This monitoring engine will be "listening" for actions on the server related to the recorded change. If the change is equal to the "action" on the system, the ticket will be flagged as: "potentially solved", solved, pending evaluation, etc. Additionally, the change can also be routed to another queue for inspection. For example, remove from Pending Queue to Review Queue.

In an example implementation, suppose that a reboot is required in order to apply a given change that has been installed on a system. The request for the change is logged on a ticketing tool (change management system) and, in this example, the change is scheduled for September 25 and the change is noted as a "reboot" being required. A change request is logged on a software agent that is running on the server where the change is scheduled with the software agent being logged with the characteristics that a "reboot" is required and that the date of the scheduled event (reboot) is September 25. Now, in this example, suppose that the server is halted ("crashes") due to a power outage one week before the scheduled event (e.g., on or around September 18). Due to the power outage, the server is rebooted in order to put the server back into service on or shortly after September 18. Now, the software agent loads when the system is booted, checks for the pending tasks, and identifies that a reboot is scheduled for September 25, however a reboot has already taken place. The agent sends a message to the change management system notifying the change management system that the reboot has already occurred. The change management system moves the ticket to the "resolved" queue indicating that the ticket has been resolved and that the maintenance (reboot) scheduled for September 25 is no longer needed (and therefore, no longer scheduled).

The approach described herein provides a 2-way system that monitors a server's status to determine if a scheduled action planned on a change system was performed before the planned (scheduled) date. This approach provides a system that automatically updates a ticketing system based on unplanned, real time events that take place on the server.

The approach provided herein can be performed on most any system, regardless of the server OS and/or the ticketing (change management) system that is being used by the client. The approach avoids unnecessary downtime and reduces the related costs. For example, to support a scheduled maintenance window an organization often needs a multidisciplinary team composed of network engineers, system admins, data center support, local support, change manager, incident managers, etc., which could be very expensive. Avoiding a maintenance window saves resources associated with downtimes while continuing to adhere to security standards and processes. The approach can also productivity increases due to the elimination of performing unnecessary server re-boots.

In one embodiment, a change (ticket) is logged on a Change Management System. The system gathers related Metadata (e.g., server name, action, date, etc.). Once the device is identified, the system executes the monitoring engine on the identified device (server). The monitoring is configured based on the parameters identified in the previous step (action, date, etc.). For example: set the monitor to detect reboots, set the monitor to detect uptime, set the monitor to detect high utilization, etc. The system listens until the action recorded on the event management (e.g., "reboot") is detected. Once the action is detected, the system checks if the action was performed before the scheduled maintenance window. If it was performed beforehand, then the system updates the parameters of the record with a plurality of options. In one embodiment, these options are "solved," "potentially solved," "pending review," etc. These options can be marked as a flag on the change management system. Notification is also sent to the change owner (e.g., system administrator, etc.) to notify the change owner regarding the updates to the change. If the change is the only change (ticket) for an upcoming maintenance window, the system automatically cancels the maintenance window and notify the owners. In one embodiment the system notifies the change owner of the scheduled maintenance cancellation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
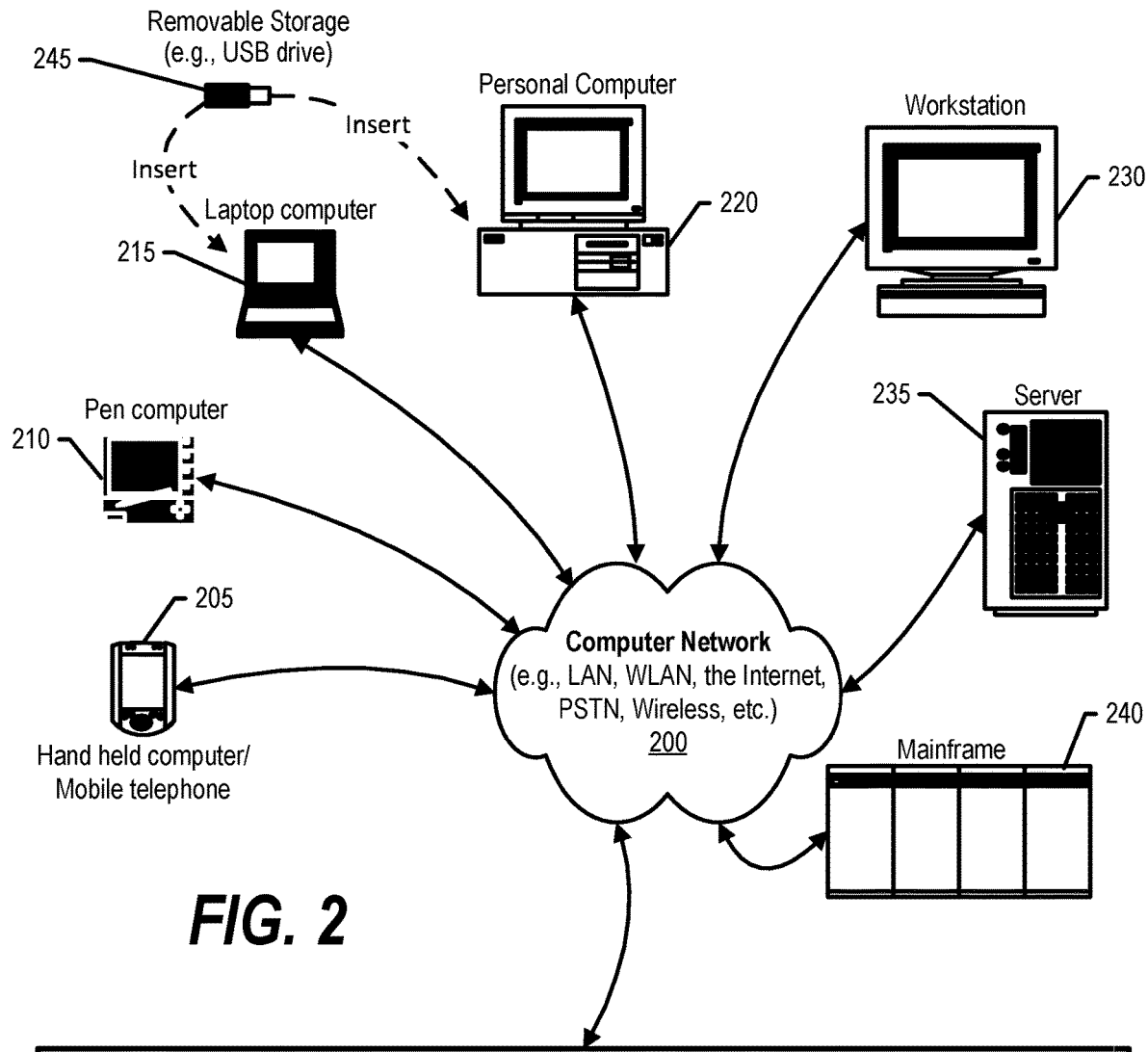
FIG. 2 provides an extension of the information handling system environment shown in FIG. 1 to illustrate that the methods described herein can be performed on a wide variety of information handling systems which operate in a networked environment.
Figure 2:
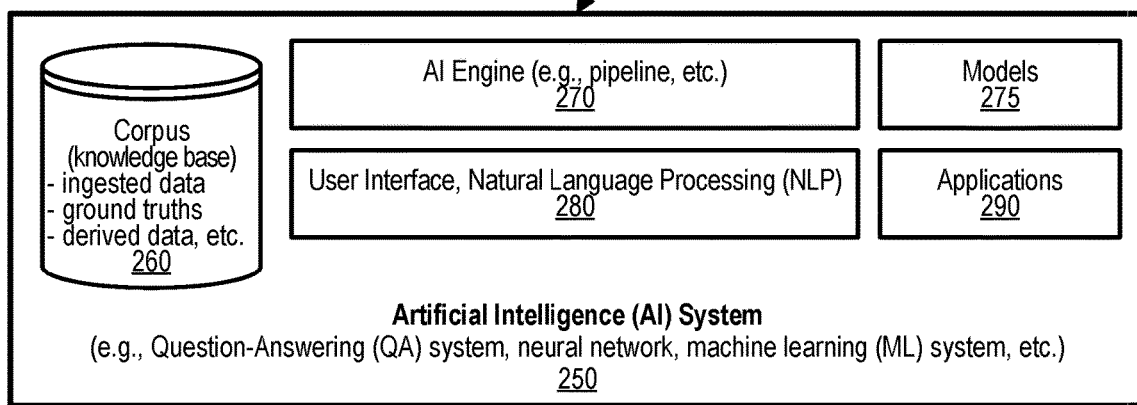

FIG. 1 is a block diagram of a data processing system in which the methods described herein can be implemented. Computing environment 100 contains an example of an environment for the execution of at least some of the computer code involved in performing the inventive methods, such as shown in the description of block 195. In addition to block 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A NETWORKED ENVIRONMENT is shown in FIG. 2. The networked environment provides an extension of the information handling system shown in FIG. 1 illustrating that the methods described herein can be performed on a wide variety of information handling systems that operate in a networked environment, depicted by computer network 200. Types of computer networks can include local area networks (LANs), wide area networks (WANs), the Internet, peer-to-peer networks, public switched telephone networks (PSTNs), wireless networks, etc. Types of information handling systems range from small handheld devices, such as handheld computer/mobile telephone 205 to large mainframe systems, such as mainframe computer 240. Examples of handheld computer 205 include smart phones, personal digital assistants (PDAs), personal entertainment devices, such as MP3 players, portable televisions, and compact disc players. Other examples of information handling systems include pen, or tablet, computer 210, laptop, or notebook, computer 215, personal computer 220, workstation 230, and server computer system 235. Other types of information handling systems that are not individually shown in FIG. 2 can also be interconnected other computer systems via computer network 200.

Many of the information handling systems include nonvolatile data stores, such as hard drives and/or nonvolatile memory depicted in FIG. 1. These nonvolatile data stores and/or memory can be included, or integrated, with a particular computer system or can be an external storage device, such as an external hard drive. In addition, removable nonvolatile storage device 245 can be shared among two or more information handling systems using various techniques, such as connecting the removable nonvolatile storage device 245 to a USB port or other connector of the information handling systems.

An ARTIFICIAL INTELLIGENCE (AI) SYSTEM is depicted at the bottom of FIG. 2. Artificial intelligence (AI) system 250 is shown connected to computer network 200 so that it is accessible by other computer systems 205 through 240. AI system 250 runs on one or more information handling systems (comprising one or more processors and one or more memories, and potentially any other computing device elements generally known in the art including buses, storage devices, communication interfaces, and the like) that connects AI system 250 to computer network 200. The network 200 may include multiple computing devices 104 in communication with each other and with other devices or components via one or more wired and/or wireless data communication links, where each communication link may comprise one or more of wires, routers, switches, transmitters, receivers, or the like. AI system 250 and network 200 may enable functionality, such as question/answer (QA) generation functionality, for one or more content users. Other embodiments of AI system 250 may be used with components, systems, sub-systems, and/or devices other than those that are depicted herein.

AI system 250 maintains corpus 260, also known as a "knowledge base," which is a store of information or data that the AI system draws on to solve problems. This knowledge base includes underlying sets of facts, ground truths, assumptions, models, derived data, and rules which the AI system has available in order to solve problems. In one embodiment, a content creator creates content in corpus 260. This content may include any file, text, article, or source of data for use in AI system 250. Content users may access AI system 250 via a network connection or an Internet connection to the network 200, and, in one embodiment, may input questions to AI system 250 that may be answered by the content in the corpus of data. As further described below, when a process evaluates a given section of a document for semantic content, the process can use a variety of conventions to query it from the AI system.

AI system 250 may be configured to receive inputs from various sources. For example, AI system 250 may receive input from the network 200, a corpus of electronic documents or other data, a content creator, content users, and other possible sources of input. In one embodiment, some or all of the inputs to AI system 250 may be routed through the network 200. The various computing devices on the network 200 may include access points for content creators and content users. Some of the computing devices may include devices for a database storing the corpus of data. The network 200 may include local network connections and remote connections in various embodiments, such that AI system 250 may operate in environments of any size, including local and global, e.g., the Internet. Additionally, AI system 250 serves as a front-end system that can make available a variety of knowledge extracted from or represented in documents, network-accessible sources and/or structured data sources. In this manner, some processes populate the AI system with the AI system also including input interfaces to receive knowledge requests and respond accordingly.

AI Engine 270, such as a pipeline, is an interconnected and streamlined collection of operations. The information works its way into and through a machine learning system, from data collection to training models. During data collection, such as data ingestion, data is transported from multiple sources, such as sources found on the Internet, into a centralized database stored in corpus 260. The AI system can then access, analyze, and use the data stored in its corpus.

Models 275 are the result of AI modeling. AI modeling is the creation, training, and deployment of machine learning algorithms that emulate logical decision-making based on the data available in the corpus with the system sometimes utilizing additional data found outside the corpus. AI models 275 provide AI system 250 with the foundation to support advanced intelligence methodologies, such as real-time analytics, predictive analytics, and augmented analytics.

User interface 280, such as Natural Language (NL) Processing (NLP) is the interface provided between AI system 200 and human uses. Semantic content is content based on the relation between signifiers, such as words, phrases, signs, and symbols, and what they stand for, their denotation, or connotation. In other words, semantic content is content that interprets an expression, such as by using NLP. Semantic data is stored as part of corpus 260. In one embodiment, the process sends well-formed questions (e.g., natural language questions, etc.) to the AI system. AI system 250 may interpret the question and provide a response to the content user containing one or more answers to the question. In some embodiments, AI system 250 may provide a response to users in a ranked list of answers. Other types of user interfaces (Uis) can also be used with AI system 250, such as a command line interface, a menu-driven interface, a Graphical User Interface (GUI), a Touchscreen Graphical User Interface (Touchscreen GUI), and the like.

AI applications 290 are various types of AI-centric applications focused on one or more tasks, operations, or environments. Examples of different types of AI applications include search engines, recommendation systems, virtual assistants, language translators, facial recognition and image labeling systems, and question-answering (QA) systems.

In some illustrative embodiments, AI system 250 may be a question/answering (QA) system, which is augmented with the mechanisms of the illustrative embodiments described hereafter. A QA type of AI system 250 may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the I QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Figure 3:
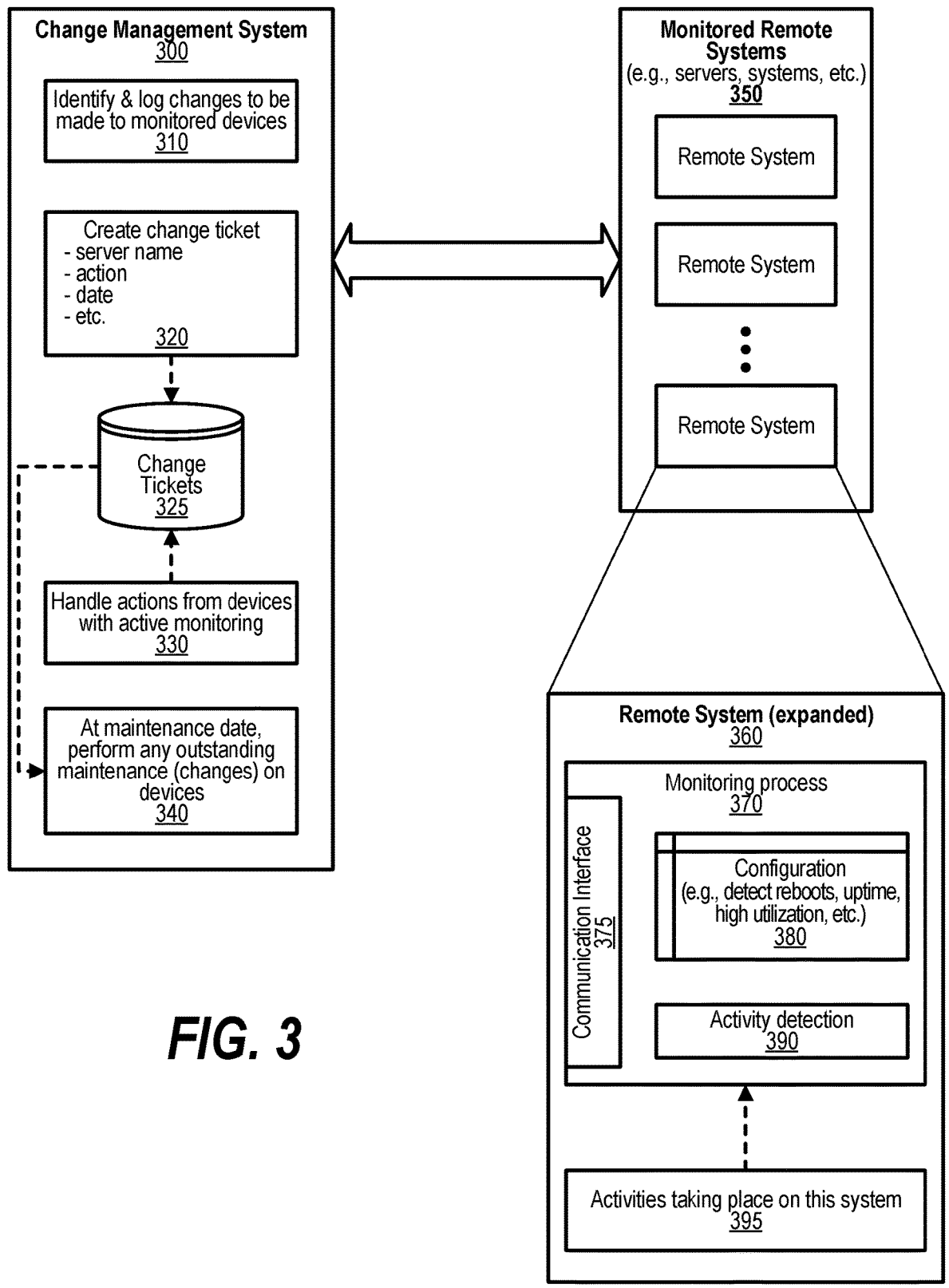
FIG. 3 is a component diagram depicting the components utilized in automatically detecting changes on servers with scheduled maintenance.

FIG. 3 is a component diagram depicting the components utilized in automatically detecting changes on servers with scheduled maintenance. Change management system 300 performs high level steps shown to handle the changes that are needed to be performed at remote systems 350. At step 310, the change management process identifies and logs changes that are to be made to monitored devices (systems). At step 320, the change management process creates a change ticket corresponding to the changes that were identified in step 310. The change ticket includes the system name (identifier), the change (action) that is to be made to the system, and the scheduled maintenance date when the changes (e.g., a reboot, etc.) are to be performed at the system. The change management system is a system and the systems that the change management system manages are referred to as "remote systems" as these systems are remote from the change management system. The created change ticket is stored in change ticket data store 325. At step 330, the change management process handles the changes (actions) that have been received from remote systems with active monitoring has been turned on, or activated. Part of handing the actions from the remote systems includes canceling any change tickets that are no longer needed to be performed because the actions received from the remote systems handled (implemented) such changes. At step 340, at the maintenance date, the change management process performs any outstanding maintenance (changes) on remote systems (e.g., reboots, etc.). These are outstanding (remaining) changes as they were not performed by the remote systems (e.g., a needed reboot, etc.) prior to the maintenance date.

Change management system 300 manages changes to be made to remote systems 350. The expansion of one of the remote systems is shown at 360 showing high level processes that take place at the remote systems. Monitoring process 370 is activated when the change management system identifies a change that is needed to the remote system (e.g., a reboot, etc.). The monitoring process includes communication interface subprocess 375 that communicates with change management system 300 to inform the change management system of activities detected by monitoring process 370. In one embodiment, configuration data 380 is used to filter the activities detected at the remote system. This filtering indicates what activities are of interest (e.g., a system reboot, uptime detection, high utilization detection, etc.). Using the configuration data, the monitoring process can filter activities taking place on the remote system (390) and only send activity detection notifications to the configuration management systems for those activities of interest, ignoring other activities that do not pertain to the changes that are needed at the remote system.

Activity notifications are sent from remote systems 350 to change management system 300 where they are handled by the change management system at process 330. This handling of activity notifications continues for all remote systems that have active monitoring turned on. The handling of these activity notifications results in cancelation of some of the change tickets stored in data store 325. When the maintenance window date arrives for a remote system, some or all of the changes scheduled for the remote system might have already taken place so that the change management system no longer needs to perform these changes at process 340.

Figure 4:
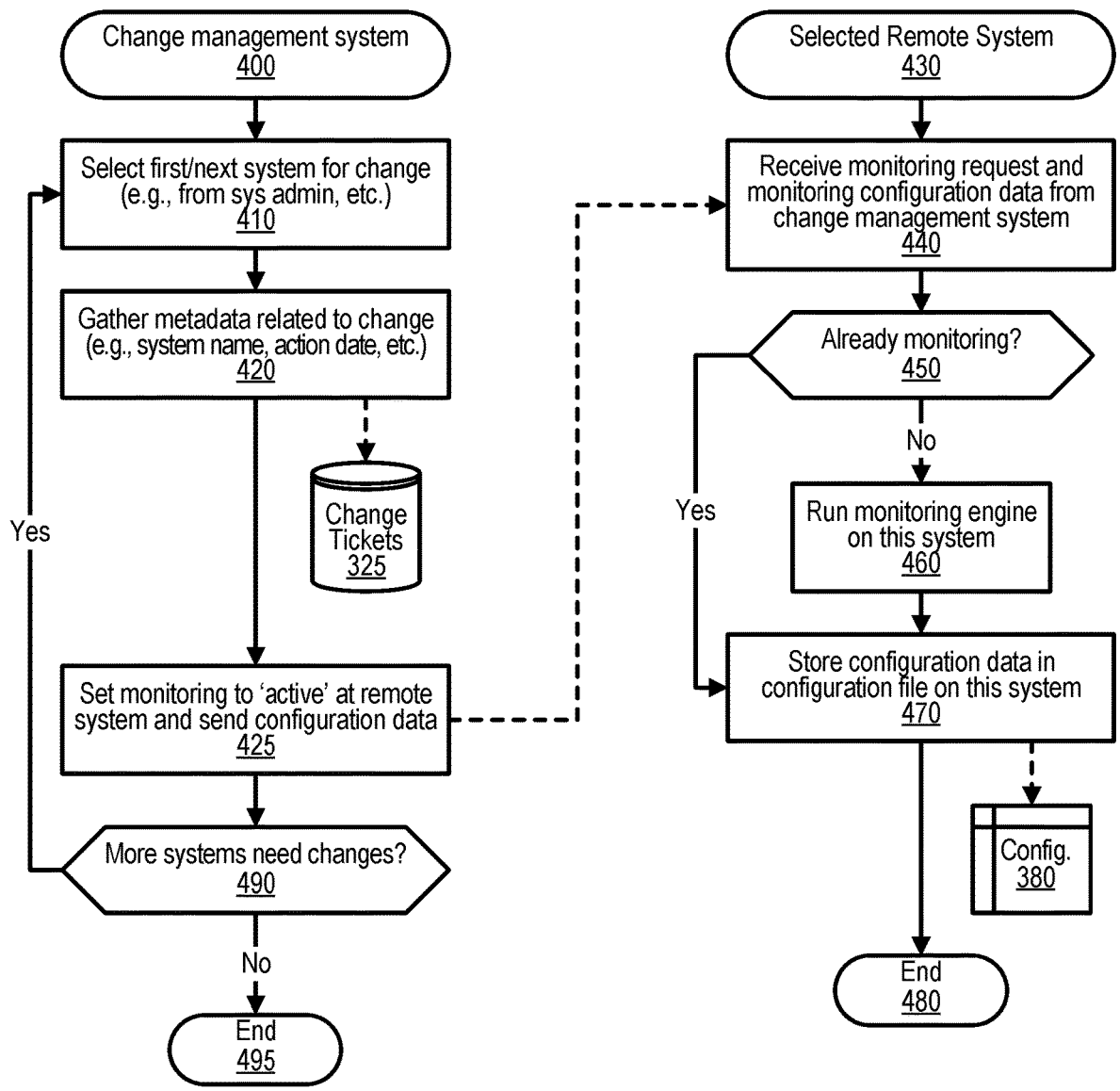
FIG. 4 is a flowchart depicting steps taken in establishing active monitoring of a server with scheduled maintenance.

FIG. 4 is a flowchart depicting steps taken in establishing active monitoring of a server with scheduled maintenance. FIG. 4 processing commences at 400 and shows the steps taken by a change management system communicating with remote systems 430. At step 410, the change management system process selects the first remote system for change (e.g., from a sys admin, owner, etc.). The change might be a reboot of the remote system, etc. At step 420, the process gathers metadata related to the change (e.g., the remote system name, the change needed, the scheduled change date/time, etc.). This change data is stored in change tickets data store 325. At step 425, the change management system process sets the monitoring to 'active' at the remote system and sends the remote system the needed configuration data that informs the remote system as to what changes are needed at the remote system (e.g., a system reboot, etc.).

Remote system processing commences at 430 and shows the steps taken at the remote system. At step 440, the remote system process receives the monitoring request from the change management system as well as the monitoring configuration data from change management system. The remote system process determines as to whether the monitoring engine, or process, is already running on the system (decision 450). If the monitoring engine is already running (indicating that other changes have already been sent to this remote system from the change management system), then decision 450 branches to the 'yes' branch to bypassing step 460. On the other hand, if the monitoring engine is not already running, then decision 450 branches to the 'no' branch whereupon, at step 460, the remote system initiates (executes) the monitoring engine to start monitoring activities that occur at this system. At step 470, the remote system process stores the received configuration data in configuration file 380 that is stored on this remote system. Remote system processing thereafter ends at 480.

Returning to the change management system processing, process next determines whether there more remote systems that need changes (decision 490). If there more remote systems that need changes, then decision 490 branches to the 'yes' branch which loops back to step 410 to select and process changes for the next remote system as described above. This looping continues until all of the remote systems that need changes have been processed, at which point decision 490 branches to the 'no' branch exiting the loop and change management system processing thereafter ends at 495.

Figure 5:
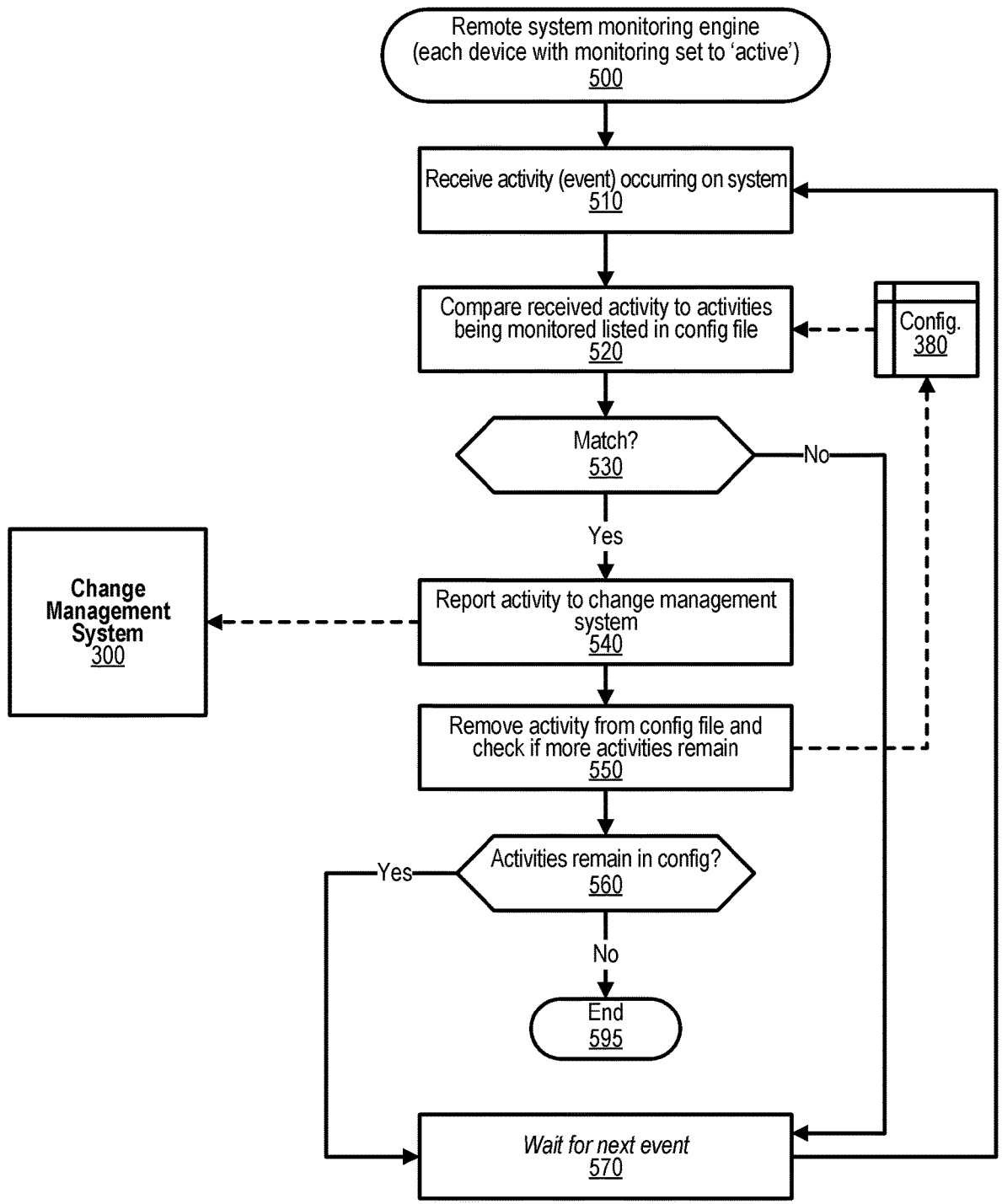
FIG. 5 is a flowchart depicting steps taken in a device monitoring engine of events occurring on a system.

FIG. 5 is a flowchart depicting steps taken by a monitoring engine running in a remote system that monitors activities occurring on the remote system. FIG. 5 processing commences at 500 and shows the steps taken by a monitoring engine process running on a remote system (each remote system with monitoring set to 'active'). At step 510, the monitoring process receives activity data regarding an event occurring on the system where the monitoring process is running. At step 520, the process compares the received activity to the activities that are being monitored that are listed in config file 380.

The process determines as to whether the activity that occurred on the system matches one of the activities (changes) listed in configuration file 380 (decision 530). If the activity that occurred on the system matches one of the activities listed in configuration file, then decision 530 branches to the 'yes' branch to perform steps 540 through 560. On the other hand, if the activity that occurred on the system does not match one of the activities listed in configuration file, then decision 530 branches to the 'no' branch bypassing steps 540 through 560 and waits for the next activity to occur at step 570.

When an activity is occurs at the system matching one of the activities from the configuration file, then steps 540 through 560 are performed. At step 540, the monitoring process sends an activity notification to change management system 300 to inform the change management system that one of the changes being handled by the change management system has been performed. At step 550, the monitoring process at the remote system removes the detected (matching) activity from configuration file 380 and checks if there more activities remaining in the configuration file.

The monitoring process determines whether activities still remain in the configuration file (decision 560). If activities remain in the configuration file, then decision 560 branches to the 'yes' branch whereupon, at step 570, the monitoring process waits for the next activity (event) to occur at the system and process the next activity as described above. On the other hand, if no more activities remain in the configuration file, then decision 560 branches to the 'no' branch and the monitoring process ends at 595.

Figure 6:
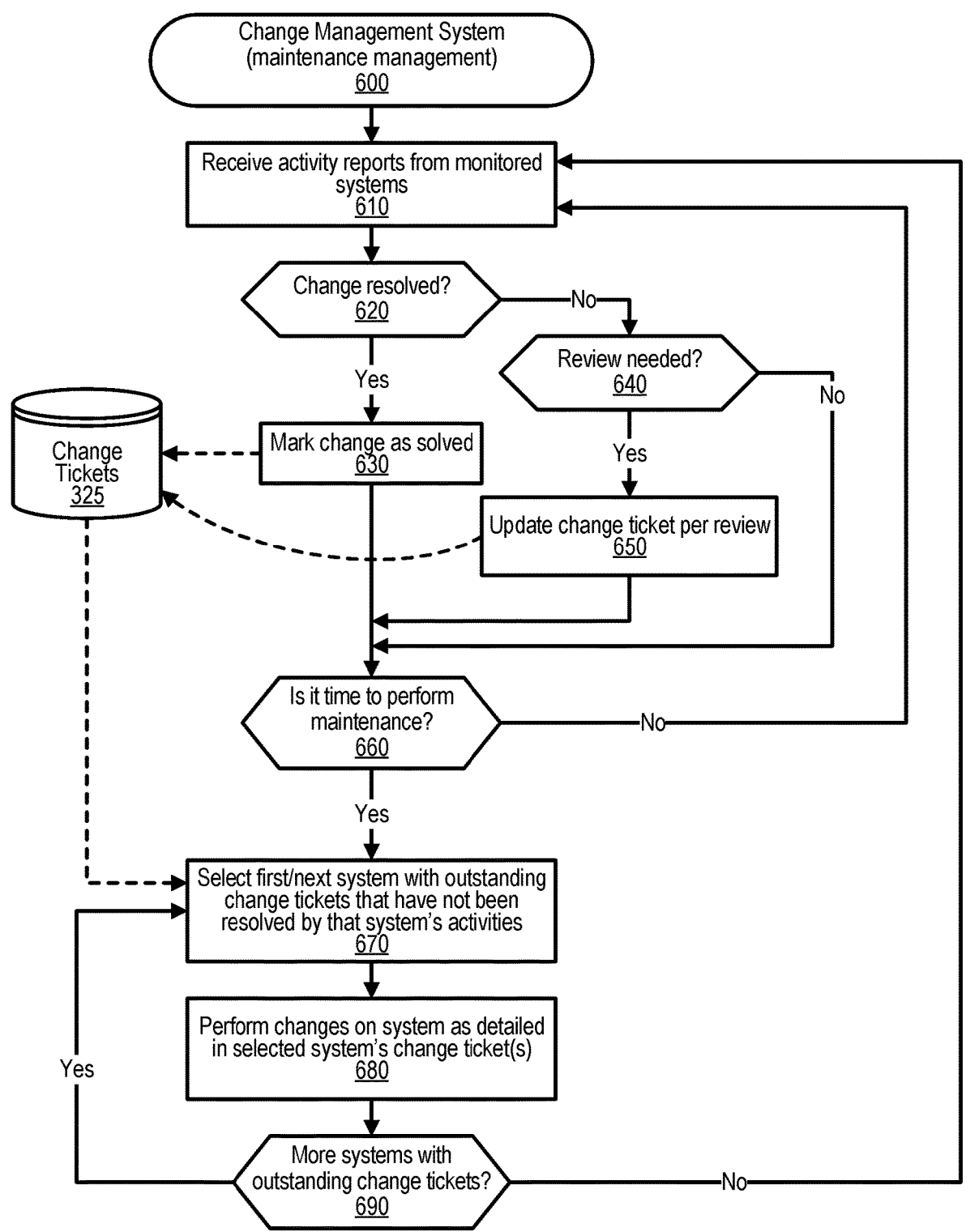
FIG. 6 is a flowchart depicting steps taken at a change management system to update scheduled maintenance of a server based on maintenance events that have already occurred on the server.

FIG. 6 is a flowchart depicting steps taken at a change management system to update scheduled maintenance of a server based on maintenance events that have already occurred on the server. FIG. 6 processing commences at 600 and shows the steps taken by the change management system in its maintenance management of remote systems).

At step 610, the change management system process receives activity notifications from monitored systems. The change management system process determines whether the change to the remote system has been resolved based on the activity notification (decision 620). If the change has been resolved, then decision 620 branches to the 'yes' branch whereupon, at step 630, the change management system process marks the change as solved in change tickets data store 325.

On the other hand, if the change was not fully resolved by the activity shown in the activity notification, then decision 620 branches to the 'no' branch for further review (steps 640 and 650). The change management system process determines whether a review is needed for the change (decision 640). If a review is needed, then decision 640 branches to the 'yes' branch whereupon, at step 650, the change ticket stored in data store 325 is updated in accordance with the review. On the other hand, if a review is not needed, then decision 640 branches to the 'no' branch bypassing step 650.

The change management system process determines whether it is time to perform maintenance (decision 660) by comparing the date/time to the starting maintenance window dates and times stored in data store 325. If it is not yet time to perform maintenance, then decision 660 branches to the 'no' branch which loops back to step 610 to continue to receive activity notifications from remote systems. This looping continues until it is time to perform maintenance at least one of the remote systems, at which point decision 660 branches to the 'yes' branch to perform steps 670 through 690.

At step 670, the change management system process selects the first remote system with outstanding change tickets stored in data store 325 that were not resolved by the remote system's activities that occurred prior to the change management time window. At step 680, the change management system process performs the changes on the remote system as detailed in selected system's change ticket(s) (e.g., reboot system, etc.). The change management system process determines whether there are more remote systems with outstanding change tickets having the same change management time window (decision 690).

If there are more remote systems with outstanding change tickets with this change management time window, then decision 690 branches to the 'yes' branch which loops back to step 670 to select and process the changes to the next remote system. This looping continues until all of the systems with outstanding changes and this change management time window have been processed, at which point decision 690 branches to the 'no' branch exiting the inner loop. Processing then loop back to step 610 to continue receiving and processing activity notifications received from remote systems.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, implemented by a processor coupled to a memory, comprising:
    determining a change needed to a selected remote system from a plurality of remote systems, the change managed at a change management system that manages changes to the plurality of remote systems;
    identifying a change management time window when the change is scheduled to be performed at the selected remote system;
    sending a monitoring request to the selected remote system, wherein the monitoring request causes the selected remote system to run a monitoring process;
    receiving, from the selected remote system, an activity notification that was identified by the monitoring process; and
    in response to the activity notification matching the change needed, canceling, at the change management system, the change scheduled at the selected remote system, wherein the monitoring process is adapted to deactivate when one or more activities, including an activity that matches the change needed, have matched each of one or more changes needed, including the change needed.

2. The method of claim 1 wherein the change needed is a reboot of the selected remote system.

3. The method of claim 1 further comprising:
    receiving, at the change management system, a plurality of activity notifications from a set of the plurality of remote systems; and
    canceling one or more changes scheduled at one or more of the set of the plurality of remote systems in response to the plurality of activity notifications matching at least one of a set of changes needed at the set of the plurality of remote systems.

4. The method of claim 1 wherein the change is one of a plurality of changes needed at the selected remote system, and wherein the method further comprises:
    removing the change that matches the activity notification, wherein one or more of the plurality of changes remain to be performed during the change management time window; and
    performing the remaining changes during the change management time window.

5. The method of claim 1 wherein the monitoring request includes the change needed and wherein the monitoring process is adapted to identify when the activity that matches the change needed is performed by the selected remote system.

6. The method of claim 1 wherein each of the one or more changes needed are selected from a group consisting of a reboot of the selected remote system, an uptime detection, and a high utilization detection.

7. An information handling system comprising:
    one or more processors;
    a memory coupled to at least one of the processors; and
    a set of instructions stored in the memory and executed by at least one of the processors to perform actions comprising:
        determining a change needed to a selected remote system from a plurality of remote systems, the change managed at a change management system that manages changes to the plurality of remote systems;
        identifying a change management time window when the change is scheduled to be performed at the selected remote system;
        sending a monitoring request to the selected remote system, wherein the monitoring request causes the selected remote system to run a monitoring process;
        receiving, from the selected remote system, an activity notification that was identified by the monitoring process; and
        in response to the activity notification matching the change needed, canceling, at the change management system, the change scheduled at the selected remote system, wherein the monitoring process is adapted to deactivate when one or more activities, including an activity that matches the change needed, have matched each of one or more changes needed, including the change needed.

8. The information handling system of claim 7 wherein the change needed is a reboot of the selected remote system.

9. The information handling system of claim 7 wherein the actions further comprise:
receiving, at the change management system, a plurality of activity notifications from a set of the plurality of remote systems; and
canceling one or more changes scheduled at one or more of the set of the plurality of remote systems in response to the plurality of activity notifications matching at least one of a set of changes needed at the set of the plurality of remote systems.

10. The information handling system of claim 7 wherein the change is one of a plurality of changes needed at the selected remote system, and wherein the actions further comprise:
removing the change that matches the activity notification, wherein one or more of the plurality of changes remain to be performed during the change management time window; and
performing the remaining changes during the change management time window.

11. The information handling system of claim 7 wherein the monitoring request includes the change needed and wherein the monitoring process is adapted to identify when the activity that matches the change needed is performed by the selected remote system.

12. The information handling system of claim 7 wherein each of the one or more changes needed are selected from a group consisting of a reboot of the selected remote system, an uptime detection, and a high utilization detection.

13. A computer program product comprising:
a non-transitory computer readable storage medium comprising a set of computer instructions that, when executed by a processor, are effective to perform actions comprising:
determining a change needed to a selected remote system from a plurality of remote systems, the change managed at a change management system that manages changes to the plurality of remote systems;
identifying a change management time window when the change is scheduled to be performed at the selected remote system;
sending a monitoring request to the selected remote system, wherein the monitoring request causes the selected remote system to run a monitoring process;
receiving, from the selected remote system, an activity notification that was identified by the monitoring process; and
in response to the activity notification matching the change needed, canceling, at the change management system, the change scheduled at the selected remote system, wherein the monitoring process is adapted to deactivate when one or more activities, including an activity that matches the change needed, have matched each of one or more changes needed, including the change needed.

14. The computer program product of claim 13 wherein the change needed is a reboot of the selected remote system.

15. The computer program product of claim 13 wherein the actions further comprise:
receiving, at the change management system, a plurality of activity notifications from a set of the plurality of remote systems; and
canceling one or more changes scheduled at one or more of the set of the plurality of remote systems in response to the plurality of activity notifications matching at least one of a set of changes needed at the set of the plurality of remote systems.

16. The computer program product of claim 13 wherein the change is one of a plurality of changes needed at the selected remote system, and wherein the actions further comprise:
removing the change that matches the activity notification, wherein one or more of the plurality of changes remain to be performed during the change management time window; and
performing the remaining changes during the change management time window.

17. The computer program product of claim 13 wherein the monitoring request includes the change needed and wherein the monitoring process is adapted to identify when an activity that matches the change needed is performed by the selected remote system.

18. The computer program product of claim 17 wherein the one or more changes needed are selected from a group consisting of a reboot of the selected remote system, an uptime detection, and a high utilization detection.

* * * * *